United States Patent
Balakrishnan et al.

(10) Patent No.: US 7,149,387 B2
(45) Date of Patent: Dec. 12, 2006

(54) DOUBLE DIFFRACTION GRATING WITH FLAT PASSBAND OUTPUT

(75) Inventors: Ashok Balakrishnan, Ottawa (CA); Serge Bidnyk, Ottawa (CA); Matt Pearson, Ashton (CA)

(73) Assignee: Enablence Inc., Kanata (CA)

( * ) Notice: Subject to any disclaimer, the term of this patent is extended or adjusted under 35 U.S.C. 154(b) by 87 days.

(21) Appl. No.: 11/140,936

(22) Filed: Jun. 1, 2005

(65) Prior Publication Data

US 2005/0213886 A1  Sep. 29, 2005

Related U.S. Application Data

(63) Continuation-in-part of application No. 10/923,987, filed on Aug. 24, 2004.

(60) Provisional application No. 60/576,595, filed on Jun. 4, 2004, provisional application No. 60/557,711, filed on Mar. 31, 2004, provisional application No. 60/555,686, filed on Mar. 24, 2004.

(51) Int. Cl.
*G02B 6/34* (2006.01)
*H04J 14/02* (2006.01)

(52) U.S. Cl. .................... 385/37; 385/14; 385/129; 385/130; 385/46; 398/82; 398/84; 398/87

(58) Field of Classification Search ............... 385/14, 385/24, 37, 46, 31, 39, 129, 130, 131, 132, 385/47, 50; 398/79, 80, 81, 82, 83, 84, 85, 398/86, 87
See application file for complete search history.

(56) References Cited

U.S. PATENT DOCUMENTS

| | | | |
|---|---|---|---|
| 6,049,644 A * | 4/2000 | Dragone | 385/37 |
| 6,111,996 A * | 8/2000 | Thompson | 385/24 |
| 6,188,818 B1 | 2/2001 | Han et al. | 385/24 |
| 6,243,514 B1 * | 6/2001 | Thompson | 385/37 |
| 6,298,186 B1 | 10/2001 | He | 385/37 |
| 6,754,413 B1 * | 6/2004 | Bacque et al. | 385/24 |
| 2005/0213886 A1 * | 9/2005 | Balakrishnan et al. | 385/46 |

* cited by examiner

*Primary Examiner*—Brian M. Healy
(74) *Attorney, Agent, or Firm*—Teitelbaum & MacLean; Neil Teitelbaum; Doug MacLean

(57) ABSTRACT

The invention relates to a double-grating subtractive-dispersion optical channel multiplexer/demultiplexer for combining or separating optical channels and providing the output channels with a flat-top response. The FSR of the first grating is substantially equal to the channel spacing of the optical channels, such that the emission from the first grating achieves a cyclic offset of incidence angle into the second grating of the system.

20 Claims, 5 Drawing Sheets

DOUBLE DIFFRACTION GRATING WITH FLAT PASSBAND OUTPUT

CROSS-REFERENCE TO RELATED APPLICATIONS

The present application is a continuation in part of U.S. patent application Ser. No. 10/923,987 filed Aug. 24, 2004, which claims priority from U.S. Patents Nos. 60/555,686 filed Mar. 24, 2004 and 60/557,711 filed Mar. 31, 2004, the present application also claims priority from U.S. Patent Application No. 60/576,595 filed Jun. 4, 2004, which are all incorporated herein by reference.

TECHNICAL FIELD

The present invention relates to a optical wavelength channel multiplexor/demultiplexor (MUX/DEMUX), and in particular to a MUX/DEMUX using a subtractive-dispersion double diffraction-grating configuration for multiplexing/demultiplexing wavelength division multiplexed (WDM) channels providing flat passband outputs.

BACKGROUND OF THE INVENTION

Ideally MUX/DEMUX systems perform consistently in spite of small fluctuations in laser wavelength, which requires that the MUX/DEMUX be designed with flat passbands in the frequency domain.

Numerous designs exist for both arrayed-waveguide grating (AWG) and echelle-grating etched waveguide spectrometers, which are used for optical MUX/DEMUX or optical channel monitors/performance monitors (OCM/OPM) in the field of optical telecommunications. Conventionally, flat-passband performance of the spectrometer unit is achieved at the expense of higher insertion loss, by degrading the shape of the passband from the ideal narrow-peaked Gaussian bandshapes, which are common to spectrometers in waveguide based devices. The bandshape is degraded by widening the optical aperture at the entrance to or exit of the spectrometer unit, and/or by introducing aberrations, e.g. de-focus, coma, spherical, to the interference element. Even for an ideal design, a flat passband top with sharp band cutoffs will come only at the expense of spectrometer transmission. Furthermore, the passband flattening will not result in temporal narrowing in the existing designs.

With conventional grating-based devices, such as the ones disclosed in U.S. Pat. No. 6,298,186 issued Oct. 2, 2001 to Jian-Jun He and U.S. Pat. No. 6,188,818 issued Feb. 13, 2001 to Han et al, a flat passband performance can only be achieved by sacrificing transmission at the peak of each channel. Moreover, there is no shortening of impulse in the time domain accompanying the flattening of the passband in the frequency domain.

Accordingly, an object of the present invention is to overcome the shortcomings of the prior art by providing a MUX/DEMUX including a pair of gratings to be used in sequence such that the emission from the first grating achieves a cyclic offset of incidence angle into the second grating of the system.

SUMMARY OF THE INVENTION

Accordingly, the present invention relates to an optical channel demultiplexer device for separating an input optical signal into a plurality of output channel bands with a given channel spacing comprising:

an input port for launching an input optical signal including a plurality of optical channel bands at the given channel spacing;

a first optical grating having a first order a first FSR substantially equal to the given channel spacing, for dispersing each optical channel band over substantially a same range of output angles;

a second optical grating having a second order and a second FSR for receiving the optical channel bands from the first reflective grating, for directing each wavelength in one of the optical channel bands at a same output angle, and for directing each optical channel band at a different output angle; and a plurality of output ports for outputting a respective one of the plurality of optical channel bands.

Another aspect of the present invention relates to an optical channel multiplexer device for combining a plurality of input channel bands with a given channel spacing into a single output signal comprising:

a plurality of input ports for inputting a respective one of the plurality of optical channel bands;

a first reflective grating having a first FSR and a first order for receiving each of the optical channel bands at different input angles from their respective input ports, and for directing each optical channel band over substantially a same range of output angles;

a second reflective grating having a second order and a second FSR substantially equal to the given channel spacing for combining each optical channel band into the output signal; and an output port for outputting the output signal.

BRIEF DESCRIPTION OF THE DRAWINGS

The invention will be described in greater detail with reference to the accompanying drawings which represent preferred embodiments thereof, wherein.

DETAILED DESCRIPTION

In optics, a diffraction grating is an array of fine, parallel, equally spaced grooves ("rulings") on a reflecting or transparent substrate, which grooves result in diffractive and mutual interference effects that concentrate reflected or transmitted electromagnetic energy in discrete directions, called "orders," or "spectral orders."

The groove dimensions and spacings are on the order of the wavelength in question. In the optical regime, in which the use of diffraction gratings is most common, there are many hundreds, or thousands, of grooves per millimeter.

Order zero corresponds to direct transmission or specular reflection. Higher orders result in deviation of the incident beam from the direction predicted by geometric (ray) optics. With a normal angle of incidence, the angle $\theta$, the deviation of the diffracted ray from the direction predicted by geometric optics, is given by the following equation, where m is the spectral order, λ is the wavelength, and d is the spacing between corresponding parts of adjacent grooves:

$$\theta = \pm \sin^{-1}\left(\frac{m\lambda}{d}\right)$$

Because the angle of deviation of the diffracted beam is wavelength-dependent, a diffraction grating is dispersive, i.e. it separates the incident beam spatially into its constituent wavelength components, producing a spectrum.

The spectral orders produced by diffraction gratings may overlap, depending on the spectral content of the incident beam and the number of grooves per unit distance on the grating. The higher the spectral order, the greater the overlap into the next-lower order. Diffraction gratings are often used in monochromators and other optical instruments.

By controlling the cross-sectional shape of the grooves, it is possible to concentrate most of the diffracted energy in the order of interest. This technique is called "blazing."

Originally high resolution diffraction gratings were ruled; however the construction of high quality ruling engines was a large undertaking. A later photolithographic technique allows gratings to be created from a holographic interference pattern. Holographic gratings have sinusoidal grooves and so are not as bright, but are preferred in monochromators because they lead to a much lower stray light level than blazed gratings. A copying technique allows high quality replicas to be made from master gratings, this helps to lower costs of gratings.

Figure 1:
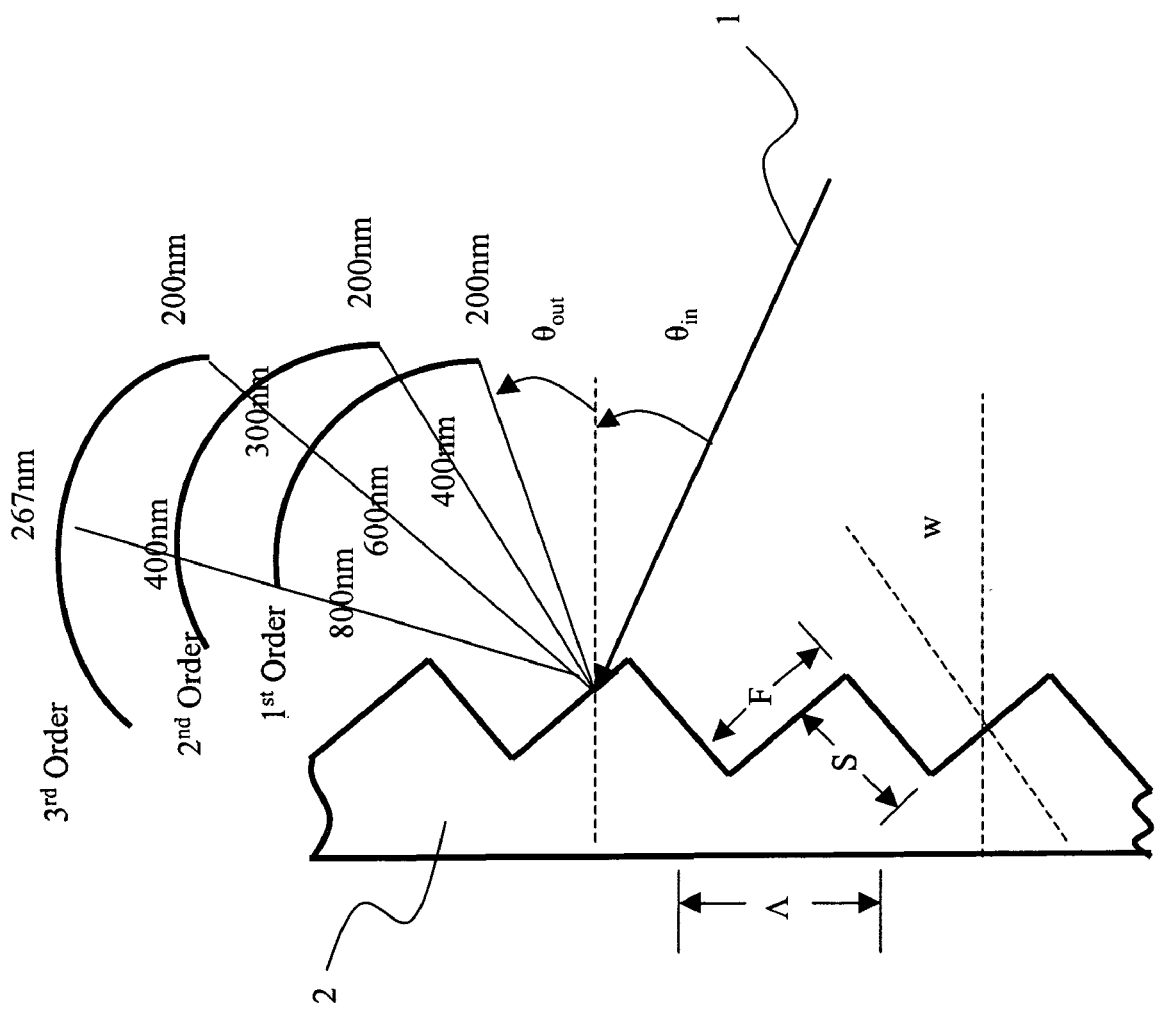
FIG. 1 is a side view of a conventional reflective diffraction grating.

A planar waveguide reflective diffraction grating includes an array of facets arranged in a regular sequence. The performance of a simple diffraction grating is illustrated with reference to FIG. 1. An optical beam 1, with a plurality of wavelength channels $\lambda_1, \lambda_2, \lambda_3 \ldots$, enters a diffraction grating 2, with grading pitch Λ and diffraction order m, at a particular angle of incidence $\theta_{in}$. The optical beam is then angularly dispersed at an angle $\theta_{out}$ depending upon wavelength and the order, in accordance with the grating equation:

$$m\lambda = \Lambda(\sin\theta_{in} + \sin\theta_{out}) \quad (1)$$

Rearranging equation (1) to yield the output angle versus the optical frequency, produces:

$$\sin\theta_{out} = \frac{mc}{fn\Lambda} - \sin\theta_{in} \quad (2)$$

Figure 2:
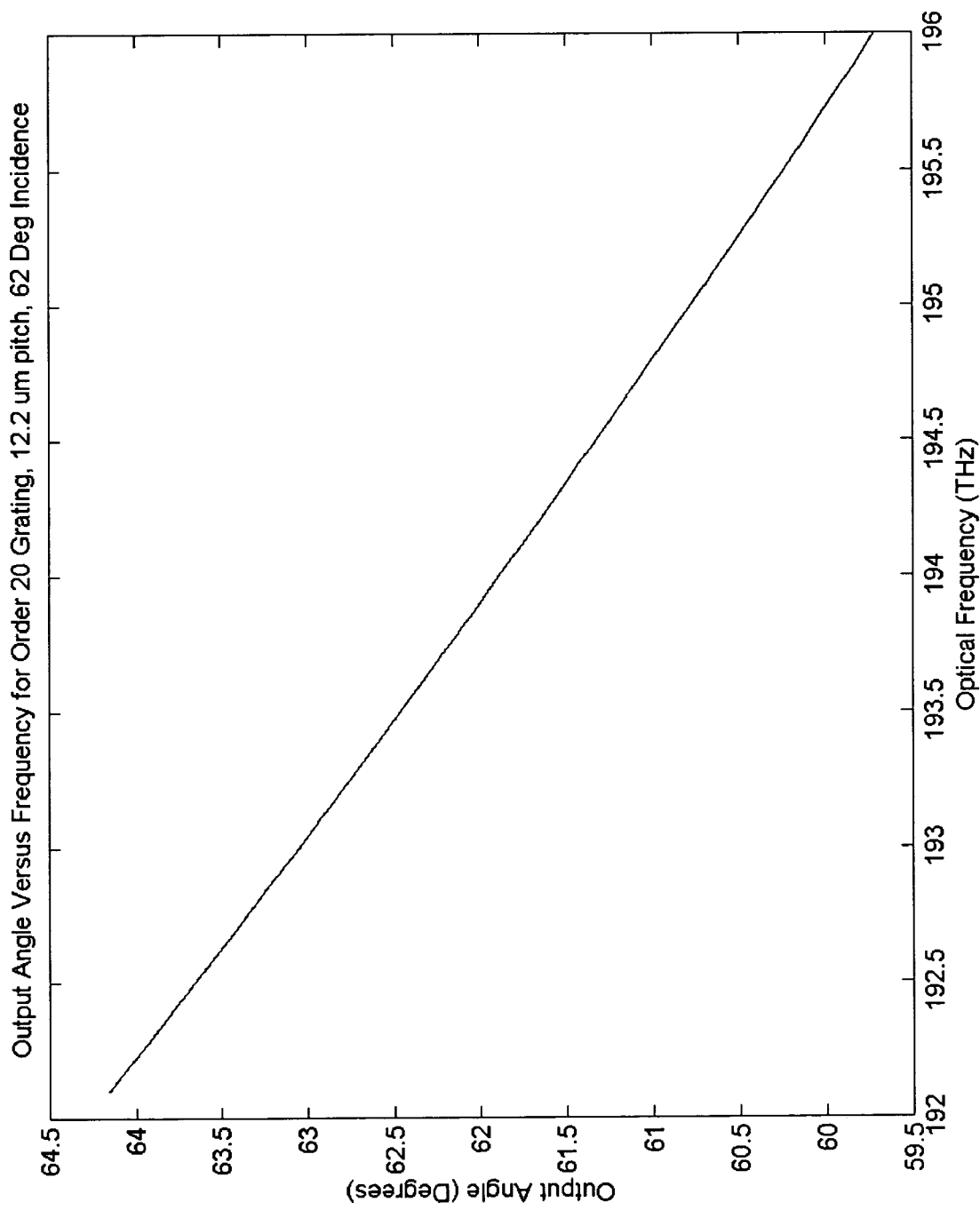
FIG. 2 is a plot of output angle vs. frequency for a reflective diffraction grating.

With reference to FIG. 2, the output angle varies in a smooth monotonic manner with respect to optical frequency. If the diffraction grating is designed for sharp imaging, and the input and output apertures are sharply defined, then the optical passband shape for this grating device will be a narrow passband shape, with virtually no insertion loss at the peak. In traditional designs, the passband is widened by deforming the grating or widening the optical apertures, such that as the frequency is swept, the response over the output aperture is dulled. The result can be a flat, and potentially sharp-sided passband, at the expense of insertion loss at the peak.

It can be seen from Equation 2 that for a given optical frequency, the output angle can be made to vary by changing the input angle. In fact this is an element of coarse/fine refractive index error correction for standard echelle-grating based optical DEMUX's and OCM/OPMs. Also, from Equation 1, for a given (fixed) output angle, the optical frequency (or wavelength) can be made to vary with the input angle.

Typically, as the optical frequency varies over the passband of a ITU-grid channel, normally the output angle of the light would vary (as in FIG. 2), and the light would sweep past the output waveguide. However, if the input angle could be made to vary in a complementary direction, i.e. introduce some frequency insensitivity, then the output angle could be held fixed in place. To be useful as a MUX/DEMUX, by the time the next frequency on the ITU grid is tuned, the light must image onto the next output waveguide, with the same insensitivity to frequency variation over the new passband.

In accordance with the present invention an angular dependence versus frequency is introduced, as in FIG. 2, but with a pattern that repeats with a controlled period, e.g. every 100 GHz as with the ITU grid spacing. To accomplish this a second diffraction grating is inserted prior to the first diffraction grating of FIG. 2, having a Free-Spectral-Range (FSR) of the required period, e.g. 100 GHz, with a geometry chosen to achieve the required angular variations.

Recasting equation (1) in terms of frequency, and subtracting the frequencies of consecutive diffraction orders for the same input/output angle combination, the difference being a constant frequency (disregarding index variations with optical frequency), which is the FSR of the grating.

$$f = \frac{mc}{n\Lambda(\sin\theta_{in} + \sin\theta_{out})} \quad (3)$$

$$f_{m+1} - f_m = FSR = \frac{c}{n\Lambda(\sin\theta_{in} + \sin\theta_{out})} = \frac{f}{m} \quad (4)$$

The required diffraction order for a given FSR is then given by $$m = \frac{f}{FSR} \quad (5)$$

For a FSR of 100 GHz and a central frequency f of 194.0 THz, the required order is m=1940. Index dispersion of the waveguide material will result in a slight error in the FSR as the frequency deviates substantially from the point at which the FSR calculation was performed. This can easily be compensated by a slight adjustment to the diffraction order.

For a similar geometry, the grating facet size will scale as the order. Whereas standard DEMUX's in low diffraction orders (m~20) have facets of ~10 μm in size, the high order grating will have a facet of ~1 mm in size.

To understand how a frequency insensitive design might work, imagine a high order (FSR=100 GHz) grating spectrometer with a Rowland Circle geometry. For convenience of calculation, the output angle of the high-order spectrometer is chosen to be the same as the input angle used in the standard order (m~20) design. We place the Rowland circle of the high-order spectrometer such that the output of this spectrometer is located at the input of a standard spectrometer. The gratings and the input to the high-order spectrometer are arranged such that the coupling of light from the high-order spectrometer to the standard spectrometer is optimum. The choice of input and output angles, and the grating geometries are for convenience of calculation only.

Figure 3:
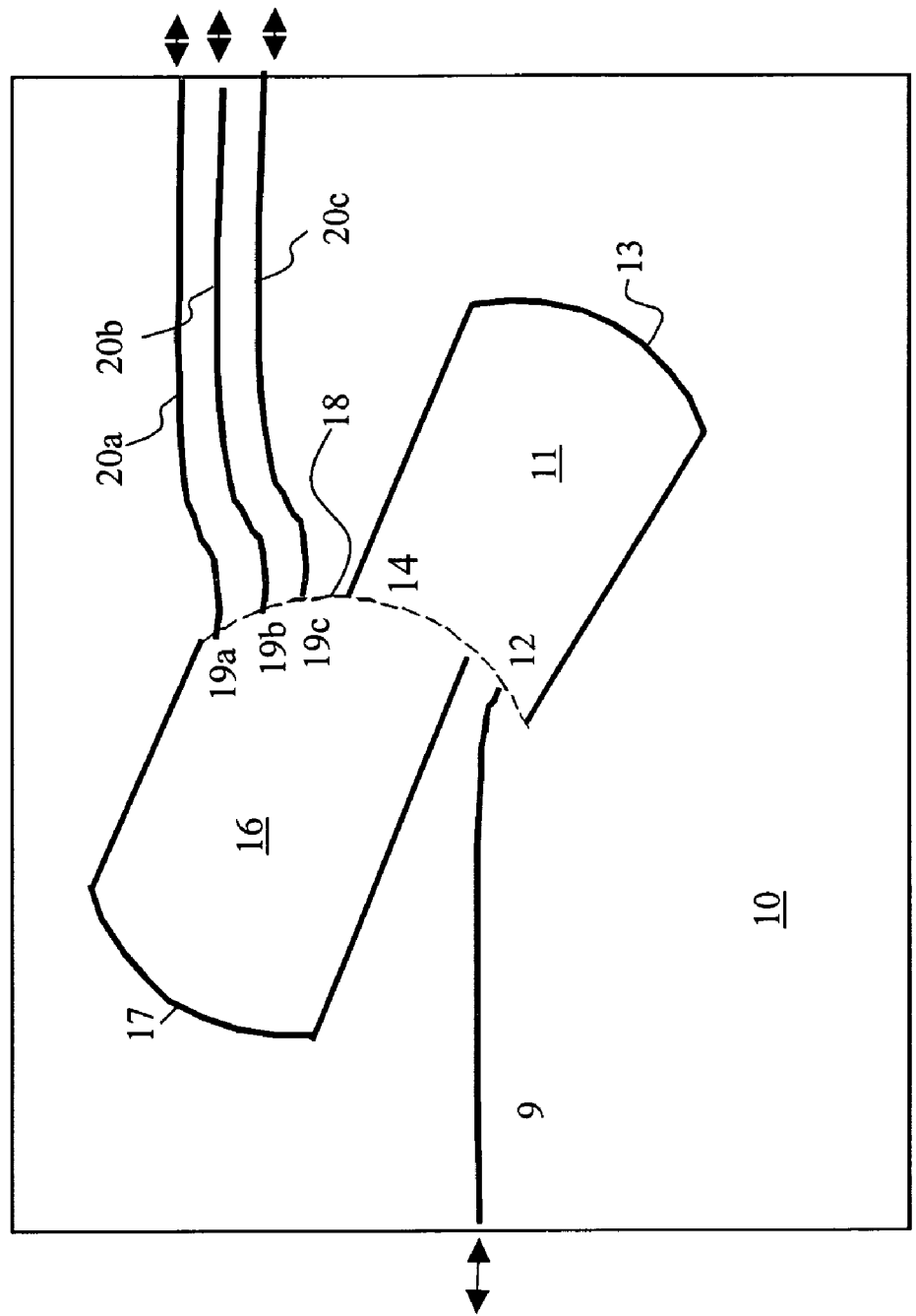
FIG. 3 is a top view of a double-grating subtractive-dispersion MUX/DEMUX according to the present invention.

With reference to FIG. 3, a WDM optical signal comprising a plurality of optical channel bands is input an optical waveguide 9 at the edge of a planar lightwave circuit chip 10 and enters a first slab waveguide 11 at input port 12. A first concave reflective grating 13 has a relatively high order, e.g. greater than 1000, preferably greater than 1500, and even more preferably greater than 1800, and a relatively small FSR, e.g. substantially the same as the channel spacing of the optical channel bands to be output. Due to the small FSR, the first grating 13 disperses each channel band over the same small range of output angles through an aperture 14 into a second slab waveguide 16. A second concave reflective grating 17 is positioned at one side of the second slab waveguide 16 opposite the first reflective grating 13 in a face-to face relationship. The first and second reflective gratings 13 and 17 have optical power and focus the light along the same line defined by a Rowland Circle 18. The second reflective grating 17 has a much lower order than the first reflective grating 13, e.g. less than 100, preferably less than 50 and even more preferably less than 25, a much higher FSR, e.g. 10 times greater than the FSR of the first grating, and is designed to convert the small range of input angles (corresponding to the small range of output angles from the first grating 13) into a single output angle for each channel band, i.e. for the small range of wavelengths the output angle of the second grating 17 remains the same. Accordingly, each wavelength in the band of wavelengths in a single channel will be directed at exactly the same spot on an output port, e.g. output port 19a, corresponding to an output waveguide, e.g. output waveguide 20a. When the next channel band hits the second grating 17, the frequency has increased, but the input angle returns to the lower end of the range, resulting in the output angle of the second grating 17 changing. The new output angle from the second grating 17 will remain fixed for all wavelengths in the new channel band, which is output a second output port, e.g. output port 19b. Other waveguides, such as optical fibers, are attached to the edge of the planar lightwave circuit chip 10 for transmitting the optical signals.

The device can also be used in a reciprocal fashion for multiplexing a plurality of input optical channel bands into a single output signal. In this case the second reflective grating 17 receives each channel band at a different input angle, which the second reflective grating 17 converts into the same small range of output angles for transmission through the aperture 14. The first reflective grating 13 then converts the small range of input angles into a single output angle, thereby combining all of the channels onto a single output waveguide 9.

In this double-grating configuration, as the input frequency tunes, the output angle of the first spectrometer will vary in a cyclic pattern according to a desired channel spacing of the second grating, i.e. the input signal and the output signals. If the geometry and facet spacing of the first spectrometer are chosen properly, the pattern will repeat every 100 GHz (or other desired channel spacing), with a variation in output angle that becomes a variation in input angle to the second spectrometer. The input angle variation with optical frequency provides a constant output angle for all wavelengths in the band of wavelengths in each channel, which can nearly exactly pin the output image to the designated output waveguide. With reference to equation 2, the second grating 17 is designed so that the change in input angle $\theta_{in}$ compensates for the change in frequency f providing a constant output angle $\theta_{out}$ over the given range of wavelengths in the channel band. For the next channel band, the frequency keeps increasing, but the input angle $\theta_{in}$ reverts back to the lower end of the repeating range, which results in a new $\theta_{out}$ for the next channel.

In actual fact, due to the index dispersion of silica, i.e. the index varies with optical frequency, the output from the first spectrometer 13 is not exactly cyclic at a 100 GHz period resulting in a gradual drift in the output angle as the frequency is tuned over the entire ITU grid. The walk-off can be partially compensated for by re-positioning the output ports 19a and 19b of the second spectrometer 17 relative to their usual positions for a fixed input aperture location. Furthermore, as explained previously, a modification can be made to the diffraction order of the first grating 7 in order to tune its period to the required value.

Figure 4:
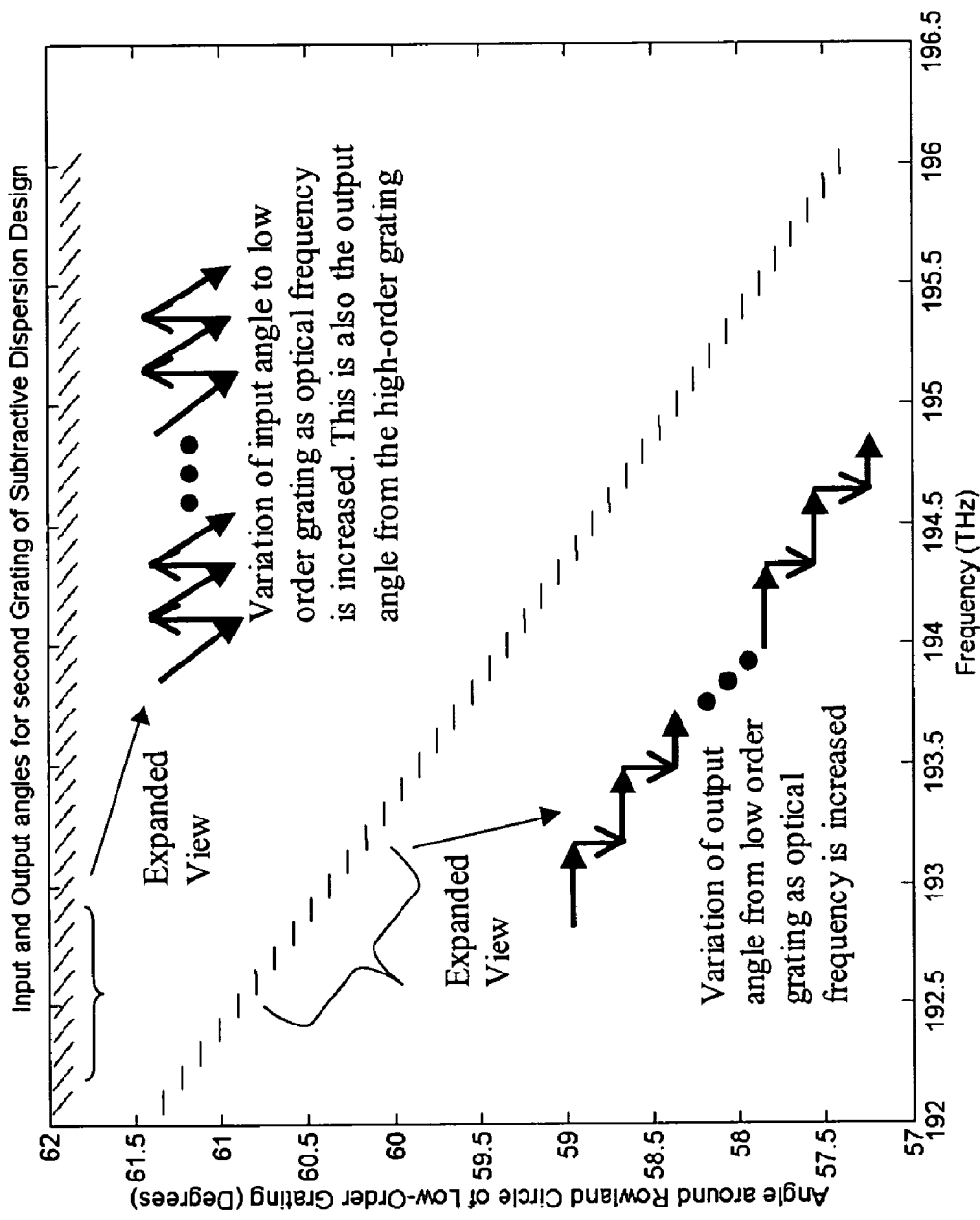
FIG. 4 illustrates a plot of input angle vs. frequency and a plot of output angle vs. frequency for the second diffraction grating of the device of FIG. 3.

FIG. 4 illustrates the near-cyclic behavior of the input angle $\theta_{in}$ to the second spectrometer 17, i.e. the output angle $\theta_{out}$ of the first spectrometer 13, versus frequency, as well as the stepped behavior of the output angle $\theta_{out}$ of the second spectrometer 17 versus optical frequency. A refractive index dispersion of $$n = 1.452061 - 1.342485 \times 10^{-5} (\lambda - 1545)$$

where $\lambda$ is stated in nanometers is used for these calculations.

FIG. 4 graphically relates the input angles to the second grating 17, and the output angles from the second grating 17, as a function of optical frequency, illustrating the cyclic nature of the input angles, and the resulting stepped response of the output angle.

The slight wavelength dependence of the refractive index (of the silica waveguides) leads to a barely perceptible shift in mean input angle to the second spectrometer 17 over the wide frequency range of the C-band; however, in general, the output angles of the second spectrometer 17 do show the expected stepped performance, i.e. over large fractions of each ITU grid the steps show little slope. The angular content of typical waveguide modes in a silica-on-silicon design will have a magnitude on the order of a few degrees. If the angle of coupling into these output guides can be held fixed to a small fraction of this mode angular content, the coupling should remain unchanged.

Figure 5:
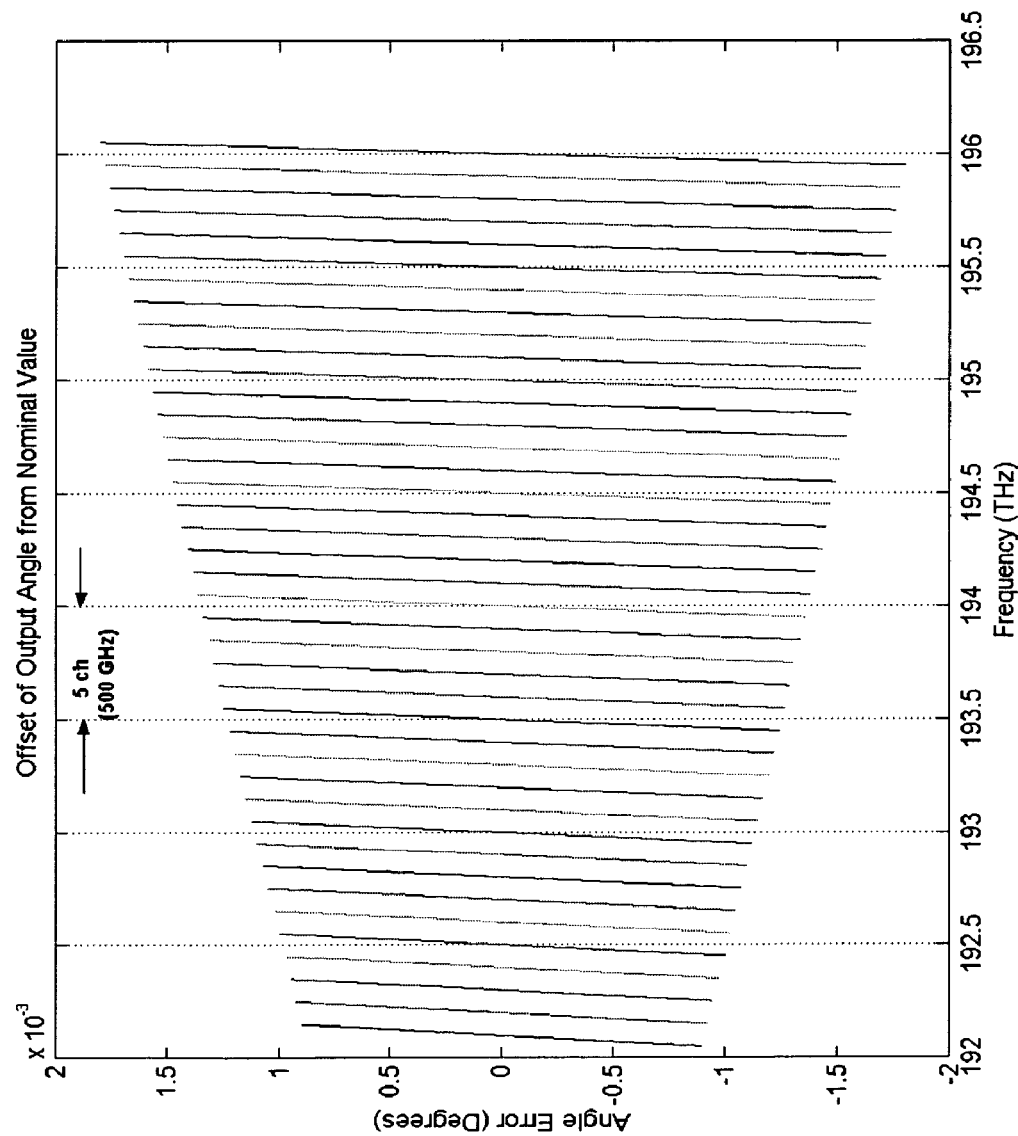
FIG. 5 is a plot of the angle error vs. frequency for the second diffraction grating of the device of FIG. 3.

The graph in FIG. 5 illustrates the deviation of the output angles from their mean position across the grid. As can be seen from the figure, the output angles are indeed pinned to their required mean position to within 2 milli-degrees. The physical spacing between the output guide is approximately 15 μm, so the physical error in the output position from the second grating will correspond to ~0.3 μm.

The double-grating subtractive-dispersion design according to the present invention has benefits in the time domain as well as the frequency domain. However, in a standard single-grating design with well optimized sharp (Gaussian) passbands, improved performance will be limited when transformed between the time and frequency domains. A temporal impulse broadening arises because the optical path from the input to any output via the near edge of the grating versus the path via the far edge of the grating differs by a non-zero length, which is indicative of the impulse broadening. As stated above, flat-top passbands are usually obtained by introducing aberrations to the grating or by increasing the input or output apertures; however, none of these solutions reduces the spread in time for different paths across the grating, i.e. the standard flat-top design does not narrow the temporal response. In the double-grating subtractive-dispersion configuration according to the present invention, a ray which follows a short path off the first grating 13 to the input of the second grating 17, will then follow a long path off the second grating 17 to the output port 19a of the second grating. The reverse holds for rays initially taking a long path from the first grating 13. As a result, temporal compression is achieved at the same time as frequency-domain broadening. Accordingly, a subtractive dispersion double-grating device can be utilized at significantly higher data bit rates than a standard design flat passband device.

The device illustrated in FIG. 3 with two gratings each operating in a Rowland circle geometry was a first embodiment provided as an example for simplicity of calculation; however, there are a few other options that may be more favorable. One option is to design the first grating with a shape that is more appropriate for imaging along a chord at the second grating's Rowland circle centered for the input to the second grating. A second option is to create the first grating to collimate its diffracted light, i.e. imaging to infinity, and the second grating would be shaped in the same manner to re-focus its diffracted light.

The output of the first grating will need to be collected efficiently by the second grating. At the same time some form of aperturing will be needed between the first and second gratings because there will be light from multiple orders emanating from the first grating near the intended input to the second grating. Much of the aperturing will be accomplished simply by the fact that the large-order grating facets are physically quite large, leading to a narrowing of the diffraction envelope from the first grating. If blazed properly, only the intended diffraction orders should arrive with any reasonable intensity onto the second grating. In order to prevent order overlap from confounding the spectrum of the second grating, aperturing would also be needed to restrict the angular range, which enters the second grating from the first one.

A subtractive dispersion spectrometer pair can also be designed using AWGs; however, in this case the high-FSR first spectrometer will have many drawbacks in terms of phase control. For etched grating based devices, facet shaping is a parameter that has no direct analog for AWGs, i.e. straight, circular, parabolic, elliptical, or other facet shapes can be implemented to control the phase of the radiation as it emerges from the high-FSR first grating.

The overall transmission of the double grating device, i.e. the height of any passband, can be quite high. Diffraction gratings that are designed to be astigmatic over limited angular regions and blazed for that region can be as efficient as ~0.5 dB excess loss. A theoretical insertion loss of ~1 dB is not unexpected for the grating-pair device. Traditional channel flattening techniques often require over twice that loss to achieve much less-optimal performance. The sharpness of the passband, i.e. the steepness of the band walls, can be increased by narrowing the frequency span covered by a given optical waveguide mode width. One simple means to do this is to increase the diameter of the Rowland circle of the second grating system, or more generally to increase the physical dispersion of the second grating system. The first grating system would have to be altered appropriately as well. The width of the passband will be limited only by the aperturing that has just been mentioned. For a 40 channel, 100 GHz design, widths of ~40–50 GHz should be achievable. Depending on the steepness of the walls, these numbers could represent −0.5 dB, 1 dB and −3 dB widths all within a few GHz of each other.

The performance of the double-grating configuration is expected to be near transform-limited, thereby providing good optical performance at higher bit-rates than standard flat-top designs allow.

The present invention can be used to create high-transmission, ultra-flat ultra-sharp passband, high bit rate compatible MUX/DEMUX's. The present invention could be applied to DWDM, CWDM, 1310/1550 nm splitters, comb filters or optical channel monitors, all by proper choice of diffraction order for the first and second gratings.

We claim:

1. An optical channel demultiplexer device for separating an input optical signal into a plurality of output channel bands at a given channel spacing comprising:
   an input port for launching the input optical signal;
   a first optical grating having a first order and a first FSR substantially equal to the given channel spacing, for dispersing each optical channel band over substantially a same range of output angles;
   a second optical grating having a second order and a second FSR for receiving the optical channel bands from the first reflective grating, for directing each wavelength in each one of the optical channel bands at a same output angle, and for directing each optical channel band at a different output angle; and
   a plurality of output ports for outputting a respective one of the plurality of optical channel bands.

2. The device according to claim 1, wherein the first and second optical gratings are both reflective optical gratings.

3. The device according to claim 2, wherein the first and second optical gratings are both concave reflective optical gratings with optical power defining first and second focal lines.

4. The device according to claims 3, wherein the first and second gratings are positioned face to face at opposite sides of a pair of interconnected slab waveguides.

5. The device according to claims 4, wherein the first and second focal lines form a single shared focal line.

6. The device according to claim 5, wherein the shared focal line is a Rowland circle.

7. The device according to claim 6, wherein the input and output ports lie along the shared focal line.

8. The device according to claim 7, further comprising waveguides extending from each of the input and output ports.

9. The device according to claim 8, wherein the first and second reflective gratings and the pair of slab waveguides form a planar lightwave circuit.

10. The device according to claim 4, wherein the second focal line defines a Rowland circle; and wherein the first focal line defines a chord of the second focal line centered on the second optical grating.

11. The device according to claim 4, wherein the first optical grating collimates the input optical signal.

12. The device according to claim 1, wherein the first order is greater than 1000; and wherein the second order is less than 100.

13. The device according to claim 1, wherein the second FSR is at least ten time greater than the first FSR.

14. An optical channel multiplexer device for combining a plurality of input channel bands with a given channel spacing into a single output signal comprising:
   a plurality of input ports for inputting a respective one of the plurality of optical channel bands;
   a first reflective grating having a first FSR and a first order for receiving each of the optical channel bands at different input angles from their respective input ports, and for directing each optical channel band over substantially a same range of output angles;

a second reflective grating having a second order and a second FSR substantially equal to the given channel spacing for combining each optical channel band into the output signal; and an output port for outputting the output signal.

15. The device according to claim 14, wherein the first and second optical gratings are both concave reflective optical gratings with optical power defining first and second focal lines.

16. The device according to claims 15, wherein the first and second gratings are positioned face to face at opposite sides of a pair of interconnected slab waveguides.

17. The device according to claims 16, wherein the first and second focal lines form a single shared focal line.

18. The device according to claim 17, wherein the shared focal line is a Rowland circle.

19. The device according to claim 14, wherein the first order is greater than 1000; and wherein the second order is less than 100.

20. The device according to claim 14, wherein the second FSR is at least ten time greater than the first FSR.

* * * * *